United States Patent
Seo et al.

(10) Patent No.: US 9,976,059 B2
(45) Date of Patent: May 22, 2018

(54) ADHESIVE COMPOSITION FOR OPTICAL USE AND ADHESIVE FILM FOR OPTICAL USE

(71) Applicant: LG Chem, Ltd., Seoul (KR)

(72) Inventors: Kwang Su Seo, Daejeon (KR); Eun Kyung Park, Daejeon (KR); Seung Won Lee, Daejeon (KR); Jang Soon Kim, Daejeon (KR); Won Gu Choi, Daejeon (KR); Tae Yi Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 15/528,929

(22) PCT Filed: Nov. 4, 2016

(86) PCT No.: PCT/KR2016/012706
§ 371 (c)(1),
(2) Date: May 23, 2017

(87) PCT Pub. No.: WO2017/078488
PCT Pub. Date: May 11, 2017

(65) Prior Publication Data
US 2017/0327714 A1    Nov. 16, 2017

(30) Foreign Application Priority Data
Nov. 5, 2015    (KR) .................. 10-2015-0155173

(51) Int. Cl.
C09J 7/20    (2018.01)
C09J 7/02    (2006.01)
(Continued)

(52) U.S. Cl.
CPC ............ C09J 7/0203 (2013.01); B32B 27/308 (2013.01); C09J 7/0225 (2013.01); C09J 11/06 (2013.01);
(Continued)

(58) Field of Classification Search
CPC ....... C09J 7/0203; C09J 11/06; B32B 27/308; Y10T 428/2852
See application file for complete search history.

(56) References Cited

U.S. PATENT DOCUMENTS

2005/0032447 A1* 2/2005 Tachibana ................. B32B 5/24
                                                           442/149
2009/0028928 A1    1/2009 Hamada et al.
(Continued)

FOREIGN PATENT DOCUMENTS

JP    H0762301 A    3/1995
JP    5192297 B2    5/2013
(Continued)

OTHER PUBLICATIONS

Search Report from International Application No. PCT/KR2016/012706, dated Feb. 13, 2017.

*Primary Examiner* — Betelhem Shewareged
(74) *Attorney, Agent, or Firm* — Lerner, David, Littenberg, Krumholz & Mentlik, LLP (57) ABSTRACT

The present invention relates to an adhesive composition for optical use, which is applied to optical devices or display devices and thus may exhibit excellent adhesion performance while exhibiting a high barrier performance based on a low water vapor transmission rate, and may implement both excellent optical characteristics and durability, and specifically, provides an adhesive composition for optical use, the adhesive composition including: a thermally curable rubber including an isobutylene-isoprene rubber having a carboxyl group and an isobutylene-isoprene rubber having a
(Continued)

hydroxy group; and a thermal crosslinking agent. Further, the present invention provides an adhesive film for optical use, including an adhesive layer including photocured products of the adhesive composition for optical use.

14 Claims, 1 Drawing Sheet

(51) Int. Cl.
    *C09J 11/06*     (2006.01)
    *C09J 123/22*     (2006.01)
    *C09J 133/06*     (2006.01)
    *C09J 201/08*     (2006.01)
    *B32B 27/30*     (2006.01)

(52) U.S. Cl.
    CPC .......... *C09J 123/22* (2013.01); *C09J 133/066* (2013.01); *C09J 201/08* (2013.01); *C09J 2201/36* (2013.01); *C09J 2203/318* (2013.01); *C09J 2409/00* (2013.01); *Y10T 428/2852* (2015.01)

(56) References Cited

U.S. PATENT DOCUMENTS

| | | | |
|---|---|---|---|
| 2009/0226707 A1* | 9/2009 | Naganawa | C09J 11/00 428/323 |
| 2012/0283375 A1 | 11/2012 | Kageyama | |
| 2015/0299518 A1 | 10/2015 | Nishijima et al. | |
| 2015/0299524 A1 | 10/2015 | Nishijima et al. | |

FOREIGN PATENT DOCUMENTS

| | | |
|---|---|---|
| KR | 20120091349 A | 8/2012 |
| KR | 20150092186 A | 8/2015 |
| KR | 20150092187 A | 8/2015 |

* cited by examiner

ADHESIVE COMPOSITION FOR OPTICAL USE AND ADHESIVE FILM FOR OPTICAL USE

CROSS-REFERENCE TO RELATED APPLICATIONS

The present application is a national phase entry under 35 U.S.C. § 371 of International Application No. PCT/KR2016/012706 filed Nov. 4, 2016, published in Korean, which claims priority from Korean Patent Application No. 10-2015-0155173filed on Nov. 5, 2015, the disclosures of which are incorporated herein by reference.

TECHNICAL FIELD

The present invention relates to an adhesive composition for optical use and an adhesive film for optical use, and the adhesive composition for optical use and the adhesive film for optical use enable sulfur- or halogen-free curing and implement excellent chemical resistance, water vapor transmission resistance, optical characteristics, and durability.

BACKGROUND ART

Touch materials including packaged electronic devices or transparent conductive films, and the like need excellent touch sensitivity for excellent operation. Furthermore, a lot of interests have been recently focused on the development of an adhesive composition for improving durability and optical characteristics of a device such as an OLED or a touch screen panel.

In general, an adhesive used in an OLED or a touch screen panel, and the like needs to secure optical characteristics such as transparency and visibility. For this purpose, in the related art, an adhesive including an acrylic resin as a base resin has been generally used, but needs to be complemented in terms of touch sensitivity, and simultaneously, it is an important problem to secure suitable modulus and optical characteristics.

In addition, adhesives using a rubber-based resin also have been developed in order to complement the disadvantages of the acrylic resins, and for example, the official gazette of Korean Patent Application Laid-Open No. 2014-0050956 discloses an adhesive composition including a rubber-based polymer, and the official gazette of Korean Patent Application Laid-Open No. 2014-0049278 also discloses that a butyl rubber-based polymer is used in order to lower a water vapor transmission rate.

However, an adhesive including a rubber-based resin as a base resin has problems in that it is difficult to achieve the chemical cross-linkage through a curing process, and a physical cross-linkage needs to be used, and as a result, it is difficult to form a curing or crosslinking structure for securing sufficient durability. Furthermore, the application of final products may be limited due to the problems.

DETAILED DESCRIPTION OF THE INVENTION

Technical Problem

An exemplary embodiment of the present invention provides an adhesive composition for optical use, which includes a chemically crosslinkable rubber through an appropriate curing process, and as a result, it is possible to secure excellent long-term durability, water vapor transmission resistance, and chemical resistance, and to provide excellent optical characteristics. Further, a rubber-based adhesive may implement excellent flexibility through a low glass transition temperature (Tg), and has excellent chemical resistance, water vapor resistance, electrical insulating properties, and the like and thus may provide an advantage favorable to the application of flexible electronic devices as a next-generation display device.

Another exemplary embodiment of the present invention provides an adhesive film for optical use, which implements excellent durability when applied to electronic devices due to the ability to achieve a chemical cross-linkage and curing of rubber itself, and has excellent optical characteristics and improved adhesion performance and water vapor transmission resistance.

Technical Solution

An exemplary embodiment of the present invention provides an adhesive composition for optical use, which use may impart excellent water vapor transmission resistance and chemical resistance to optical devices or electronic devices and implement improved long-term durability and optical characteristics, the adhesive composition including: a thermally curable rubber including an isobutylene-isoprene rubber having a carboxyl group and an isobutylene-isoprene rubber having a hydroxy group; and a thermal crosslinking agent.

Another exemplary embodiment of the present invention provides an adhesive film for optical use, including an adhesive layer including thermally cured products of the adhesive composition for optical use.

Advantageous Effects

The adhesive composition for optical use may impart excellent water vapor transmission resistance and chemical resistance to optical devices or electronic devices to which the adhesive composition is applied, and may implement excellent long-term durability and optical characteristics.

Further, the adhesive film for optical use may be utilized in various electronic devices compared to an existing adhesive film including an acrylic resin or a rubber-based resin as a base resin, and may exhibit excellent attaching properties and long-term reliability.

MODE FOR INVENTION

The benefits and features of the present invention, and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims. Throughout the specification, like reference numerals indicate like constituent elements.

In the drawings, the thicknesses of layers and regions are exaggerated for clarity. In the drawings, the thicknesses of some layers and regions are exaggerated for convenience of explanation.

Further, in the present specification, when a part such as a layer, a film, a region, and a plate is present "on" or "at an upper portion of" another part, the case includes not only a case where the part is present "immediately on" another part, but also a case where still another part is present therebetween. Conversely, the case where a part is present "immediately on" another part means that no other part is present therebetween. Furthermore, when a part such as a layer, a film, a region, and a plate is present "under" or "at a lower portion of" another part, the case includes not only a case where the part is present "immediately under" another part, but also a case where still another part is present therebetween. Conversely, the case where a part is present "immediately under" another part means that no other part is present therebetween.

An exemplary embodiment of the present invention provides an adhesive composition for optical use, including: a thermally curable rubber including an isobutylene-isoprene rubber having a carboxyl group and an isobutylene-isoprene rubber having a hydroxy group; and a thermal crosslinking agent.

The isobutylene-isoprene rubber used in an adhesive in the related art was subjected to physical crosslinking through thermal curing or photocuring based on sulfur, or subjected to crosslinking by substituting the rubber itself with halogen. Alternatively, rubber was contained in an adhesive by a method of mixing a photocurable monomer with an isobutylene-isoprene rubber to cure the photocurable monomer by light irradiation.

In the case where sulfur or halogen components are used in an adhesive, a problem such as corrosion may be caused when the adhesive is applied to a final electronic product, and accordingly, the application range is narrow, and in the case where a photocurable monomer is used, there is a problem in that it is difficult to secure peel strength required because the rubber itself does not participate in the curing.

In order to solve the problems, the present invention introduces a thermally curable functional group into the isobutylene-isoprene rubber through chemical modification, thereby including a thermally curable rubber which can be thermally cured itself. Specifically, the thermally curable functional group is a carboxyl group or a hydroxy group.

Since the adhesive composition for optical use includes a thermally curable rubber including an isobutylene-isoprene rubber including a carboxyl group and an isobutylene-isoprene rubber including a hydroxy group, and thus need not use sulfur or halogen components for curing, there is no risk of corrosion against an object to be attached, and since rubber itself may form a crosslinking structure through thermal curing, it is possible to obtain an advantage in that excellent long-term durability and water vapor transmission resistance are implemented, and peel strength required is obtained.

According to an exemplary embodiment of the present invention, the content of an isoprene unit of the isobutylene-isoprene rubber may be 1 mol % or more and 30 mol % or less, based on the total mole number of an isobutylene unit and an isoprene unit. Further, the content of the isoprene unit may be 1% or more and 30% or less, based on the total unit of the isobutylene-isoprene. The content of the isoprene unit may be the same as the content of an isoprene monomer based on the total copolymerization monomers when the isobutylene-isoprene rubber is prepared.

When the content of isoprene is adjusted to 1 mol % or more based on the total mole number of an isobutylene unit and an isoprene unit, a carboxyl group or a hydroxy group may be easily introduced, and the rubber itself may be smoothly crosslinked through thermal curing. Furthermore, when the content of isoprene is adjusted to 30 mol % or less based on the total mole number of an isobutylene unit and an isoprene unit, the moisture permeability and gas permeability of the adhesive composition for optical use may be implemented at a low level, and as a result, it is possible to prevent corrosion of electronic devices to which the adhesive composition is applied.

In the present specification, the isobutylene unit and the isoprene unit may mean an isobutylene repeating unit and an isoprene repeating unit in the isobutylene-isoprene rubber, respectively.

Specifically, the isobutylene-isoprene rubber may be a copolymer formed from a monomer mixture including about 70 mol % to about 99 mol % of isobutylene and about 1 mol % to about 30 mol % of isoprene. In this case, when the content of isobutylene is less than about 70 mol % and the content of isoprene is more than about 30 mol %, the moisture permeability and gas permeability of the adhesive composition for optical use are increased, and as a result, there is a concern in that the corrosion of electronic devices to which the adhesive composition is applied may be caused. In addition, when the content of isobutylene is more than about 99 mol % and the content of isoprene is less than about 1 mol %, it is difficult to introduce a carboxyl group or a hydroxy group into the isobutylene-isoprene rubber, and as a result, there is a concern in that the rubber itself is not sufficiently crosslinked through thermal curing.

According to an exemplary embodiment of the present invention, the carboxyl group and the hydroxy group may be each grafted to the isoprene unit of the isobutylene-isoprene rubber. Specifically, the carboxyl group and the hydroxy group may be each bonded to the main chain of the isobutylene-isoprene rubber. More specifically, the carboxyl group and the hydroxy group may be each grafted to the isoprene unit in the main chain of the isobutylene-isoprene rubber.

That is, the thermally curable functional group may be introduced into an isoprene unit, but an isobutylene unit. Whereby, the degree of unsaturation of the rubber components may be minimized, the yellowing phenomenon may be prevented by introducing a photocurable functional group into an isoprene unit, and excellent water vapor transmission resistance and viscoelasticity characteristics may be secured. Furthermore, the thermally curable functional group may be grafted to an isoprene unit to be randomly distributed in the rubber chains, and as a result, it is possible to obtain an advantage in that efficient crosslinking can be achieved and the long-term durability and stable physical properties of a final film can be implemented.

Specifically, the isobutylene-isoprene rubber having the carboxyl group and the isobutylene-isoprene rubber having the hydroxy group may have a degree of unsaturation of 0 to 1.0, for example, 0 to 0.5. The degree of unsaturation indicates a degree to which multiple bonds are included in a chemical structure, and may be measured by IR spectroscopy or 1H NMR. The high degree of unsaturation means that a large amount of multiple bonds are included. Specifically, the degree of unsaturation may mean the number of units including multiple bonds based on the number of isoprene units. For example, when there are no multiple bonds in the repeating unit of the isobutylene-isoprene rubber having the carboxyl group, the degree of unsaturation may be 0. In addition, when the number of repeating units having multiple bonds is half the number of isoprene units of the isobutylene-isoprene rubber having the carboxyl group, the degree of unsaturation may be 0.5.

When the degree of unsaturation of the rubber satisfies the aforementioned range, the adhesive composition for optical use may implement excellent weatherability and durability, and most preferably, the degree of unsaturation may be 0.

According to an exemplary embodiment of the present invention, the isobutylene-isoprene rubber having the carboxyl group and the isobutylene-isoprene rubber having the hydroxy group may each have a weight average molecular weight (Mw) of 10,000 to 1,000,000, for example, about 150,000 to about 800,000. When the weight average molecular weight of the thermally curable rubber satisfies the aforementioned range, it is possible to sufficiently secure a physical entanglement site by the crosslinking structure after thermal curing, and it is possible to improve the durability of products to which the adhesive composition for optical use is applied. Further, when the adhesive composition for optical use is coated, a problem of dewetting may be prevented, and the uniformity of the coating may be improved. In addition, the adhesive composition is allowed to have an appropriate viscosity and thus may be advantageous in terms of process conditions and compatibility with other components.

According to an exemplary embodiment of the present invention, the isobutylene-isoprene rubber having the carboxyl group may be a rubber in which a carboxyl group is bonded to an isoprene unit. The carboxyl group may be a carboxyl group in which a straight-chained or branch-chained alkylene group, of which the ends are bonded to a carboxyl group, is bonded to an isoprene unit.

According to an exemplary embodiment of the present invention, the content of a carboxyl group of the isobutylene-isoprene rubber having the carboxyl group may be 1 mol % or more and 30 mol % or less, based on the total mole number of an isobutylene unit and an isoprene unit. That is, the isobutylene-isoprene rubber having the carboxyl group may include a carboxyl group in an amount of 1 mol % to about 30 mol % based on the total mole number of the repeating units. By introducing a carboxyl group into the isobutylene-isoprene rubber at a content within the aforementioned range, an appropriate crosslinking density may be formed through thermal curing, and excellent durability may be implemented through an appropriate gel content.

According to an exemplary embodiment of the present invention, the isobutylene-isoprene rubber having the hydroxy group may be a rubber in which a hydroxy group is bonded to an isoprene unit. The hydroxy group may be a hydroxy group which is bonded to an isoprene unit in the form of isopropanol.

According to an exemplary embodiment of the present invention, the content of a hydroxy group of the isobutylene-isoprene rubber having the hydroxy group may be 1 mol % or more and 30 mol % or less, based on the total mole number of an isobutylene unit and an isoprene unit. That is, the isobutylene-isoprene rubber having the hydroxy group may include a hydroxy group in an amount of about 1 mol % to about 30 mol % based on the total mole number of the repeating units. By introducing a hydroxy group into the isobutylene-isoprene rubber at a content within the aforementioned range, an appropriate crosslinking density may be formed through thermal curing, and excellent durability may be implemented through an appropriate gel content.

According to an exemplary embodiment of the present invention, the adhesive composition for optical use may include the thermal crosslinking agent in an amount of 0.05 to 5 parts by weight based on 100 parts by weight of the thermally curable rubber. The thermal crosslinking agent is a material which is chemically bonded to the carboxyl group or the hydroxy group to form a crosslinking structure, and when the content of the thermal crosslinking agent satisfies the aforementioned range, the adhesive composition may secure a crosslinking density and a gel content which is appropriate for optical use.

According to an exemplary embodiment of the present invention, the thermal crosslinking agent may include one selected from the group consisting of an aziridine-based crosslinking agent, an amine-based crosslinking agent, an isocyanate-based crosslinking agent, an epoxy-based crosslinking agent, and a combination thereof. For example, the thermal crosslinking agent may include an isocyanate-based crosslinking agent, and in this case, the curing efficiency may be improved due to the excellent reactivity with the carboxyl group or the hydroxy group.

Specifically, the isocyanate-based crosslinking agent may include a trifunctional isocyanate compound. In this case, the adhesive composition for optical use may be advantageous in implementing excellent durability through an appropriate gel content.

The thermally curable rubber includes the isobutylene-isoprene rubber having the carboxyl group or the isobutylene-isoprene rubber having the hydroxy group, and may include, for example, both the isobutylene-isoprene rubber having the carboxyl group and the isobutylene-isoprene rubber having the hydroxy group.

According to an exemplary embodiment of the present invention, the weight ratio of the isobutylene-isoprene rubber having the carboxyl group:the isobutylene-isoprene rubber having the hydroxy group may be 1:9 to 9:1, specifically, 1:9 to 6:4, 2:8 to 6:4, or 3:7 to 6:4. When the weight ratio of the isobutylene-isoprene rubber having the carboxyl group:the isobutylene-isoprene rubber having the hydroxy group satisfies the aforementioned range, cured products of the adhesive composition for optical use may secure an appropriate gel content, may prevent the durability from deteriorating due to a lifting phenomenon, and the like, and may secure an appropriate peel strength against a substrate such as glass. That is, a gel content appropriate for optical use, and excellent durability and adhesion performance may be all secured by satisfying the weight ratio range.

According to an exemplary embodiment of the present invention, the adhesive composition for optical use may further include one selected from the group consisting of a reaction accelerator, a curing retarder, a tackifier, and a combination thereof.

The reaction accelerator serves to allow the crosslinking reaction of a thermal crosslinking agent and a hydroxy group or a carboxyl group to rapidly proceed and to lower the reaction temperature, and specifically, may include one selected from the group consisting of a tin catalyst, a bismuth catalyst, a mercury-based catalyst, an amine-based catalyst, and a combination thereof.

For example, the tine catalyst may include one selected from the group consisting of dibutyltin dilaurate, stannous octoate, and a combination thereof, the mercury-based catalyst may include phenylmercury neodecanoate, and the amine-based catalyst may include one selected from the group consisting of triethyl amine, 1,4-diazabicyclo[2,2,2] octane, and a combination thereof. When the kind of reaction accelerator is used, the crosslinking reaction of the thermal crosslinking agent and a hydroxy group or a carboxyl group may rapidly proceed, and the curing efficiency of the adhesive composition for optical use may be improved by lowering the reaction temperature.

When the adhesive composition for optical use includes the reaction accelerator, the reaction accelerator may be included in an amount of about 0.01 to about 5.0 parts by weight based on 100 parts by weight of the thermally curable rubber. When the reaction accelerator is included at a content within the aforementioned range, the rate of the crosslinking reaction of the thermal crosslinking agent and a hydroxy group or a carboxyl group may be efficiently improved without causing an unnecessary side reaction, and economical advantage may be obtained. For example, when the reaction accelerator is used in an excessive amount, the reaction rate is excessively high, so that a partial gelation occurs, and as a result, it may be difficult to produce a uniform film.

The curing retarder serves to suppress a reaction until a step prior to a film coating after a final adhesive composition is blended, and specifically, may include a ketone-based curing retarder. When the kind of curing retarder is used, the stability of the final adhesive composition may be maintained, and it is possible to obtain an advantage in that a pot-life until the step prior to the film coating is sufficiently secured.

When the adhesive composition for optical use includes the curing retarder, the curing retarder may be included in an amount of about 0.01 to about 5.0 parts by weight based on 100 parts by weight of the thermally curable rubber. When the curing retarder is included at a content within the aforementioned range, it is possible to obtain an effect of preventing the gelation of a finally blended composition. In addition, when the curing retarder is used in an excessive amount, there is a concern in that an effective crosslinking may not be achieved by interfering with the curing reaction of the adhesive composition.

The adhesive composition for optical use includes rubber, and has an aspect in which it is difficult to secure sufficient peel strength and adhesion strength due to the low water vapor transmission thereof. Accordingly, the adhesive composition for optical use may further include a tackifier.

Specifically, according to an exemplary embodiment of the present invention, the tackifier may include one selected from the group consisting of a hydrogenated dicyclopentadiene-based compound, a hydrogenated terpene-based compound, a hydrogenated rosin-based compound, a hydrogenated aromatic compound, a hydrogenated petroleum-based compound, and a combination thereof. The tackifier includes a compound having a hydrogenated structure and thus may be advantageous in implementing transparency, and excellent adhesion strength and peel strength may be implemented because the tackifier is less affected by the thermal energy during the thermal curing.

For example, the tackifier may include a hydrogenated dicyclopentadiene-based compound or a hydrogenated rosin-based compound, and in this case, it is possible to obtain an effect in that particularly, the tack performance is imparted and optical characteristics such as light transmittance and haze are improved.

The hydrogenated tackifier may be a partially hydrogenated or completely hydrogenated tackifier. Specifically, the hydrogenated tackifier may have a hydrogenation rate of about 60% or more, for example, 100%. When the hydrogenation rate is less than about 60%, a large amount of double bonds are included in the molecule, and as a result, there is a concern in that the visibility and transparency of an adhesive layer formed of the adhesive composition deteriorate, and as the tendency that the double bonds absorb thermal energy is increased, during the irradiation of thermal energy for curing, the double bonds absorb the thermal energy, and as a result, there may occur a problem in that adhesion properties and peel strength become non-uniform.

In addition, the tackifier may have a softening point of about 80° C. to about 150° C., specifically about 80° C. to about 130° C., and more specifically about 90° C. to about 120° C. The term 'softening point' refers to a temperature at which when heated, a material starts to be deformed or softened by heat. When the softening point of the tackifier is less than about 80° C., the tackifier is softened at a relatively low temperature, and accordingly, there may occur a problem in that the high-temperature reliability of an adhesive including the tackifier deteriorates, and when an adhesive film is prepared by using the adhesive, there may occur a problem in that it is difficult to distribute and store the adhesive film at a high temperature, and when the softening point of the tackifier is more than about 150° C., there is a problem in that it is difficult to implement an adhesion promoting effect of an adhesive at normal temperature, and there is a concern in that there may occur a problem in that the adhesive becomes hard even though a small amount of the tackifier is added to the adhesive.

When the adhesive composition for optical use includes the tackifier, the tackifier may be included in an amount of about 10 to about 70 parts by weight based on 100 parts by weight of the thermally curable rubber. When the tackifier is used at a content within the aforementioned range, the peel strength of the adhesive composition for optical use against a substrate may be improved.

According to an exemplary embodiment of the present invention, the adhesive composition for optical use may not include an additional photocurable component. Specifically, the adhesive composition for optical use includes a thermally curable rubber including an isobutylene-isoprene rubber having a carboxyl group or an isobutylene-isoprene rubber having a hydroxy group, and thus may not include an additional photocurable component.

In the case of an adhesive composition in the related art in which an isobutylene-isoprene rubber component is used as a base resin, an additional component is needed for photocuring or thermal curing because the isobutylene-isoprene rubber component does not directly participate in a curing reaction. For example, as described above, physical crosslinking is performed through thermal curing or photocuring based on sulfur, or crosslinking is performed by substituting the rubber itself with halogen. Alternatively, rubber is contained in an adhesive by a method of mixing a photocurable monomer with an isobutylene-isoprene rubber to cure the photocurable monomer by light irradiation.

In the case where sulfur or halogen components are used in an adhesive, a problem such as corrosion may be caused when the adhesive is applied to a final electronic product, and accordingly, the application range is narrow, and in the case where a photocurable monomer is used, there is a problem in that the peel strength deteriorates or the durability is not good because the rubber itself does not participate in the curing.

However, since the thermally curable rubber of the present invention includes an isobutylene-isoprene rubber having a carboxyl group or an isobutylene-isoprene rubber having a hydroxy group, the rubber itself may participate in the curing, and accordingly, it is possible to obtain an advantage in that the thermally curable rubber of the present invention does not need an additional photocurable component, and is advantageous in terms of securing the peel strength and durability.

Furthermore, the adhesive composition for optical use according to the present invention may not include an additional sulfur or halogen component for thermal curing or photocuring. Accordingly, when the adhesive composition for optical use is applied to electronic products or optical devices, and the like, excellent long-term durability may be implemented because corrosion and the like are not caused.

Another exemplary embodiment of the present invention provides an adhesive film for optical use, including an adhesive layer including thermally cured products of the adhesive composition for optical use. The adhesive film for optical use is applied to displays, electronic devices, and the like, and may exhibit excellent optical characteristics and durability because the adhesive film for optical use has an adhesive layer including thermally cured products of the adhesive composition for optical use.

The adhesive layer includes thermally cured products of the adhesive composition for optical use, the thermally cured products may be prepared by adding thermal energy to the adhesive composition for optical use, and in this case, a carboxyl group or a hydroxy group of a rubber in the adhesive composition for optical use may form a crosslinking structure with a thermal crosslinking agent, and then the thermally cured products may be cured.

The adhesive layer may have a gel content of about 40 wt % to about 100 wt %, or about 55 wt % to about 100 wt %, and for example, about 60 wt % to about 90 wt %. When the gel content satisfies the aforementioned range, the adhesive layer may exhibit excellent step absorbency and attaching properties, and may be applied to displays, electronic devices, and the like to implement excellent durability.

The adhesive layer includes thermally cured products of the adhesive composition for optical use, and the adhesive composition for optical use contains the thermally curable rubber, and excellent water vapor transmission resistance, improved durability, and excellent optical characteristics may simultaneously implemented through the adhesive layer and the adhesive composition.

Specifically, the adhesive layer may have a peel strength against a glass substrate of about 600 g/in or more or about 950 g/in or more, for example, about 950 g/in to about 2,500 g/in. Simultaneously, the adhesive layer may have a water vapor transmission rate (WVTR) of 10 $g/m^2 \cdot 24$ hr or less, for example, about 7 $g/m^2 \cdot 24$ hr or less, for example, more than about 0 $g/m^2 \cdot 24$ hr and less than about 7 $g/m^2 \cdot 24$ hr at a thickness of 50 μm. When the adhesive layer simultaneously satisfies a peel strength within the aforementioned range and a water vapor transmission rate within the aforementioned range, an excellent long-term durability may be imparted to displays or electronic devices to which the adhesive film is applied.

Further, the adhesive layer may have a light transmittance of about 90% or more, and a haze of less than about 2.5%, for example, less than about 2.0%. When the adhesive layer satisfies a light transmittance and a haze within the aforementioned ranges, the adhesive layer may be usefully applied to parts of displays or electronic devices, which require the visibility, and may exhibit excellent visibility.

Further, the adhesive layer may have a viscoelasticity ratio (=a viscosity ratio:an elasticity ratio) of about 30% or more at a high temperature of 60° C. to 120° C. When the adhesive layer has a viscoelasticity ratio within the aforementioned range at a high temperature, it is possible to exhibit excellent adhesion properties, and simultaneously, to prevent generation of bubbles or a lifting phenomenon, and the like.

In addition, the adhesive layer may have a glass transition temperature (Tg) of about −60° C. to about −40° C. When the glass transition temperature of the adhesive layer satisfies the aforementioned range, the peel strength may be improved, and the tack may be increased.

According to an exemplary embodiment of the present invention, the adhesive layer may have a storage modulus of about 0.15 MPa to about 0.25 MPa at a normal temperature of about 20° C. to about 30° C. When the adhesive layer satisfies a storage modulus within the aforementioned range at normal temperature, it is possible to implement excellent durability in which bubbles and a lifting phenomenon are not generated, and to secure an improved step absorbing performance.

The adhesive layer is formed from the adhesive composition for optical use, and may be the most preferable when all of the gel content, the peel strength against a glass substrate, the water vapor transmission rate, the light transmittance, and the haze simultaneously satisfy the above-described ranges. The satisfaction of these properties may be achieved by controlling the thermally curable rubber contained in the adhesive composition for optical use, and specifically, these properties may be adjusted by blending an isobutylene-isoprene rubber having a carboxyl group and an isobutylene-isoprene rubber having a hydroxy group at an appropriate weight ratio.

According to an exemplary embodiment of the present invention, the adhesive film for optical use may include a release film layer stacked on one surface or both surfaces of the adhesive layer.

Figure 1:
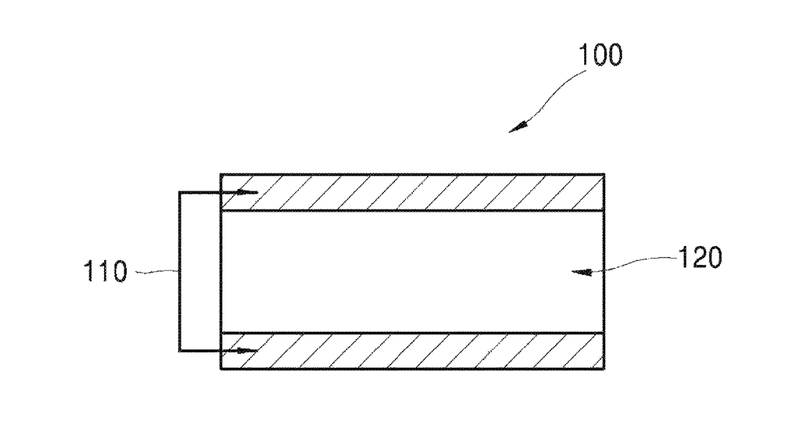
FIG. 1 schematically illustrates the cross-section of an adhesive film for optical use according to an exemplary embodiment of the present invention.

FIG. 1 schematically illustrates the cross-section of an adhesive film 100 for optical use according to an exemplary embodiment of the present invention. Referring to FIG. 1, the adhesive film 100 for optical use includes an adhesive layer 120, and may include a release film layer 110 stacked on one surface or both surfaces of the adhesive layer 120.

The release film layer is a layer which is peeled off and removed when the adhesive film for optical use is applied to a final product, and may be formed on one surface or both surfaces of the adhesive layer depending on a position where the adhesive layer is disposed in a final product.

The release film layer may have a structure in which a release agent is applied on one surface of a substrate film. In this case, the release film layer may be disposed such that a surface to which the release agent is applied is brought into contact with the adhesive layer.

In this case, the substrate film is not particularly limited, but, for example, a polyethylene terephthalate (PET) film may be used in order to favor the distribution and tailoring of the adhesive film for optical use without being impaired by thermal energy irradiated for the thermal curing of the adhesive composition for optical use.

The release agent is not particularly limited, but it may be advantageous to use a silicone-based product in order to easily remove a release film layer by securing an appropriate peel strength for being peeled from an adhesive layer formed from the adhesive composition for optical use and in order for a residue not to remain when the adhesive film is applied to a final product.

Hereinafter, specific examples of the present invention will be suggested. However, the Examples described below are only provided for specifically exemplifying or explaining the present invention, and the present invention is not limited thereby.

PREPARATION EXAMPLES

Preparation Example 1

Preparation of Isobutylene-Isoprene Rubber Having Hydroxy Group

An isobutylene-isoprene rubber being a copolymer formed from a monomer mixture including 1.7 mol % of isoprene and 98.3 mol % of isobutylene was prepared. 3 parts by weight of a peroxide (mCPBA) were put into 100 parts by weight of the isobutylene-isoprene rubber in a 2 L reactor equipped with a cooling apparatus such that a nitrogen gas was refluxed and the temperature was easily adjusted, and then the resulting mixture was stirred at 30° C. for 6 hours. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was warmed to 90° C., and the mixture was stirred for 1 hour. An isobutylene-isoprene rubber (IIR—OH) having a hydroxy group grafted to an isoprene unit of the main chain was prepared.

Preparation Example 2

Preparation of Isobutylene-Isoprene Rubber Having Carboxyl Group

An isobutylene-isoprene rubber being a copolymer formed from a monomer mixture including 1.7 mol % of isoprene and 98.3 mol % of isobutylene was prepared. 3 parts by weight of maleic anhydride and 1.75 parts by weight of dibenzoyl peroxide were put into 100 parts by weight of the isobutylene-isoprene rubber in a 2 L reactor equipped with a cooling apparatus such that a nitrogen gas was refluxed and the temperature was easily adjusted, and then the resulting mixture was stirred at 60° C. to 80° C. for 5 hours. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was warmed to 90° C., and the mixture was stirred for 1 hour. An isobutylene-isoprene rubber (IIR—COOH) having a carboxyl group grafted to an isoprene unit of the main chain was prepared.

Preparation Example 3

Preparation of Isobutylene-Isoprene Rubber Having Hydroxy Group

An isobutylene-isoprene rubber (IIR—OH) having a hydroxy group grafted to an isoprene unit of the main chain was prepared in the same manner as in Preparation Example 1, except that an isobutylene-isoprene rubber being a copolymer formed from a monomer mixture including 0.5 mol % of isoprene and 99.5 mol % of isobutylene was used.

Preparation Example 4

Preparation of Isobutylene-Isoprene Rubber Having Carboxyl Group

An isobutylene-isoprene rubber (IIR—COOH) having a carboxyl group grafted to an isoprene unit of the main chain was prepared in the same manner as in Preparation Example 3, except that an isobutylene-isoprene rubber being a copolymer formed from a monomer mixture including 0.5 mol % of isoprene and 99.5 mol % of isobutylene was used.

Preparation Example 5

Preparation of Isobutylene-Isoprene Rubber Having Hydroxy Group

In Preparation Example 5, an isobutylene-isoprene rubber (IIR—OH) having a hydroxy group grafted to an isoprene unit of the main chain was prepared in the same manner as in Preparation Example 1, except that an isobutylene-isoprene rubber being a copolymer formed from a monomer mixture including 28 mol % of isoprene and 72 mol % of isobutylene was used.

Preparation Example 6

Preparation of Isobutylene-Isoprene Rubber Having Carboxyl Group

In Preparation Example 6, an isobutylene-isoprene rubber (IIR—COOH) having a carboxyl group grafted to an isoprene unit of the main chain was prepared in the same manner as in Preparation Example 3, except that an isobutylene-isoprene rubber being a copolymer formed from a monomer mixture including 28 mol% of isoprene and 72 mol% of isobutylene was used.

Preparation Example 7

Preparation of Isobutylene-Isoprene Rubber Having Hydroxy Group

In Preparation Example 7, an isobutylene-isoprene rubber (IIR—OH) having a hydroxy group grafted to an isoprene unit of the main chain was prepared in the same manner as in Preparation Example 1, except that an isobutylene-isoprene rubber being a copolymer formed from a monomer mixture including 35 mol % of isoprene and 65 mol % of isobutylene was used.

Preparation Example 8

Preparation of Isobutylene-Isoprene Rubber Having Carboxyl Group

In Preparation Example 8, an isobutylene-isoprene rubber (IIR—COOH) having a carboxyl group grafted to an isoprene unit of the main chain was prepared in the same manner as in Preparation Example 3, except that an isobutylene-isoprene rubber being a copolymer formed from a monomer mixture including 35 mol % of isoprene and 65 mol % of isobutylene was used.

Examples and Comparative Examples

Examples 1 to 8

In each of Examples 1 to 8, an adhesive composition was prepared by containing a thermally curable rubber including the isobutylene-isoprene rubber (IIR—COOH) having the carboxyl group, which was formed from Preparation Example 2, and the isobutylene-isoprene rubber (IIR—OH) having the hydroxy group, which was formed from Preparation Example 1, at a weight ratio as described in the following Table 1, and mixing 1.2 parts by weight a trifunctional isocyanate-based crosslinking agent (Asahi Kasei, TKA-100), 1.0 part by weight of a tin catalyst as a reaction accelerator, 1.0 part by weight of acetylacetone (purity 99%, manufactured by DAEJUNG Chemical & Metals Co., Ltd.) as a curing retarder, and 15 parts by weight of a hydrogenated terpene-based compound (DertopheneT-115, manufactured by DRT) as a tackifier, based on 100 parts by weight of the thermally curable rubber.

Example 9

An adhesive composition was prepared by adjusting the weight ratio of the isobutylene-isoprene rubber (IIR—OH) having the hydroxy group, which was formed from Preparation Example 1, and the isobutylene-isoprene rubber (IIR—COOH) having the carboxyl group, which was formed in Preparation Example 2, to 4:6, mixing 30 parts by weight of a hydrogenated terpene-based compound (DertopheneT-115, manufactured by DRT), and using the same additives used in Examples 1 to 8.

Example 10

An adhesive composition was prepared by adjusting the weight ratio of the isobutylene-isoprene rubber (IIR—OH) having the hydroxy group, which was formed from Preparation Example 5, and the isobutylene-isoprene rubber (IIR—COOH) having the carboxyl group, which was formed in Preparation Example 6, to 4:6, mixing 30 parts by weight of a hydrogenated terpene-based compound (DertopheneT-115, manufactured by DRT), and using the same additives used in Examples 1 to 8.

Comparative Examples 1 and 2

In each of Comparative Examples 1 and 2, an adhesive composition was prepared in the same manner as in Examples 1 to 8, except that the thermally curable rubber included an isobutylene-isoprene (IIR—COOH) having a carboxyl group and an isobutylene-isoprene rubber (IIR—OH) having a hydroxy group at the weight ratio as described in the following Table 1.

TABLE 1

| | IIR-COOH:IR-OH |
|---|---|
| Example 1 | 1:9 |
| Example 2 | 2:8 |
| Example 3 | 3:7 |
| Example 4 | 5:5 |
| Example 5 | 6:4 |
| Example 6 | 7:3 |
| Example 7 | 8:2 |
| Example 8 | 9:1 |
| Example 9 | 4:6 |
| Example 10 | 4:6 |
| Comparative Example 1 | 0:10 |
| Comparative Example 2 | 10:0 |

Comparative Example 3

An adhesive composition for optical use was prepared by mixing 10 parts by weight of a dicyclopentadiene acrylate monomer as a photocurable component, 0.5 part by weight of a photoinitiator (Irgacure 651), and 10 parts by weight of a hydrogenated dicyclopentadiene-based tackifier (D-100, manufactured by DRT), based on 100 parts by weight of an isobutylene-isoprene rubber being a copolymer formed from a monomer mixture including 1.7 mol% of an isoprene and 98.3 mol% of isobutylene, which did not have a carboxyl group or a hydroxy group.

Comparative Example 4

An adhesive composition for optical use was prepared by mixing 0.5 part by weight of a photoinitiator (Irgacure 651) and 20 parts by weight of a hydrogenated dicyclopentadiene-based tackifier (D-100, manufactured by DRT), based on 100 parts by weight of an acrylic resin.

Reference Example 1

The weight ratio of the isobutylene-isoprene rubber (IIR—OH) having the hydroxy group, which was formed from Preparation Example 3, and the isobutylene-isoprene rubber (IIR—COOH) having the carboxyl group, which was formed from Preparation Example 4, was adjusted to 4:6, and an adhesive composition was prepared in the same manner as in Examples 1 to 8.

Reference Example 2

The weight ratio of the isobutylene-isoprene rubber (IIR—OH) having the hydroxy group, which was formed from Preparation Example 7, and the isobutylene-isoprene rubber (IIR—COOH) having the carboxyl group, which was formed from Preparation Example 8, was adjusted to 4:6, and an adhesive composition was prepared in the same manner as in Examples 1 to 8.

<Evaluation>

The adhesive composition according to each of Examples 1 to 10, Comparative Examples 1 and 2, and Reference Examples 1 and 2 was prepared in the form of a film, and then thermally cured products were formed at a temperature of 120° C. while drying the film, and an adhesive layer having a thickness of 50 µm, including the thermally cured products was prepared.

In the case of Comparative Examples 3 and 4, photocured products were formed by irradiating a UV light energy of 2,000 mJ/cm² thereon, and an adhesive layer having a thickness of 50 µm, including the photocured products was prepared.

Experimental Example 1

Measurement of Gel Content

The initial weights (Wi) of samples obtained by cutting each of the adhesive layers in the Examples and the Comparative Examples into a predetermined size were measured. Subsequently, the samples were immersed in a toluene solvent and left to stand for 24 hours, and subsequently, the samples were filtered by using a filtration apparatus, and then the weights (Wf) were measured. Subsequently, the gel contents were derived by the following Equation 1, and the results are shown in the following Table 2.

$$\text{Gel content (\%)} = \{1-(Wi-Wf)/Wi\} \times 100 \quad \text{[Equation 1]}$$

Experimental Example 2

Measurement of Durability

A glass substrate was attached to one surface of each of the adhesive layers in the Examples and the Comparative Examples, a release film was removed from the other surface and was replaced with an ITO film, and then the resulting glass substrate was left to stand under conditions of a temperature of 85° C. and a relative humidity of 85% for 24 hours to 120 hours. Subsequently, bubbles and a lifting phenomenon were observed by the unaided eye to measure the durability. The measurement results are shown in the following Table 2, and specifically, the case where no bubbles nor lifting phenomenon were generated was marked with ○, and the case where bubbles and a lifting phenomenon were generated was marked with x.

Experimental Example 3

Measurement of Water Vapor Transmission Rate

For each of the adhesive layers in the Examples and the Comparative Examples, a water vapor transmission rate (WVTR) was measured by adding a predetermined amount of water to a cup under conditions of a temperature of 38° C. and a relative humidity of 90%, loading the adhesive layer thereon, capping the cup, and then measuring the WVTR by means of Labthink TSY-T3 using a weight loss of water evaporated for 24 hours, and the results are shown in the following Table 2.

Experimental Example 4

Measurement of Peel Strength

For each of the adhesive layers in the Examples and the Comparative Examples, peel strength against a glass substrate was measured at a peel rate of 300 mm/min by using a universal testing machine (UTM), and the results are as described in the following Table 2.

Experimental Example 5

Measurement of Optical Characteristics

1) Measurement of Light Transmittance (T)

Each of the adhesive layers in the Examples and the Comparative Examples was attached to a transparent glass substrate, and then light transmittance was measured by using a UV-Vis spectrometer under a normal temperature condition of 20° C. to 30° C.

2) Measurement of Haze (H)

Each of the adhesive layers in the Examples and the Comparative Examples was attached to a transparent glass substrate, and then a haze was measured by using a haze meter device (manufactured by BYK Co., Ltd.) under a normal temperature condition of 20° C. to 30° C.

TABLE 2

|  | IIR-COOH:IIR-OH | Gel content [%] | Durability | Water vapor transmission rate [g/m² · 24 hr] | Peel strength [g/in] | Optical characteristics (%) T | H |
| --- | --- | --- | --- | --- | --- | --- | --- |
| Example 1 | 1:9 | 80 | ○ | 4.8 | 600 | 91.9 | 1.00 |
| Example 2 | 2:8 | 73 | ○ | 4.9 | 950 | 91.9 | 1.21 |
| Example 3 | 3:7 | 69 | ○ | 4.8 | 1510 | 91.9 | 1.38 |
| Example 4 | 5:5 | 67 | ○ | 6.8 | 1213 | 92.4 | 1.15 |
| Example 5 | 6:4 | 62 | ○ | 6.5 | 1259 | 92.6 | 1.43 |
| Example 6 | 7:3 | 54 | x | 4.8 | 1350 | 92.4 | 1.78 |
| Example 7 | 8:2 | 47 | x | 4.2 | 1554 | 92.3 | 1.81 |
| Example 8 | 9:1 | 40 | x | 4.8 | 2300 | 92.3 | 1.81 |
| Example 9 | 6:4 | 64 | ○ | 4.6 | 2500 | 92.3 | 1.16 |
| Example 10 | 6:4 (IP 28 mol %) | 62 | ○ | 9.2 | 1450 | 92.6 | 1.02 |
| Comparative Example 1 | 0:10 | 89 | ○ | 4.6 | 400 | 91.9 | 1.30 |
| Comparative Example 2 | 10:0 | 70 | x | 7.6 | 2010 | 92.3 | 1.90 |
| Comparative Example 3 | IIR (IP 1.78 mol %) | 62 | x | 5.8 | 700 | 92.3 | 0.7 |
| Comparative Example 4 | Acrylic resin | 89 | ○ | 180.0 | 1800 | 92.8 | 0.2 |
| Reference Example 1 | 6:4 (IP 0.5 mol %) | 22 | x | 4.8 | 1225 | 92.3 | 1.32 |
| Reference Example 2 | 6:4 (IP 35 mol %) | 67 | x | 16.8 | 1310 | 92.0 | 1.11 |

Referring to the results in Table 2, Comparative Examples 1 and 2 are an adhesive composition including only any one of an isobutylene-isoprene rubber (IIR—COOH) having a carboxyl group and an isobutylene-isoprene rubber (IIR—OH) having a hydroxy group, Examples 1 to 5 including both the IIR—COOH and the IIR—OH implement all of the water vapor transmission rate, the peel strength, and the durability at a predetermined level or more, and Examples 6 to 8 exhibit the results that the durability was partially insufficient, but the water vapor transmission rate, the peel strength, the optical characteristics, and the like are excellent. Further, in the case of Example 9, the peel strength increase effect may be obtained without any abnormality in durability through an increase in content of the tackifier. In contrast, in the case of Comparative Example 1, there was a problem in that the peel strength was extremely low, and in the case of Comparative Example 2, it could be seen that the water vapor transmission rate and the durability failed to satisfy the required levels.

In the case of Reference Example 1, it could be confirmed that when a hydroxy group and a carboxyl group are modified using an isobutylene-isoprene rubber having 0.5 mol % of isoprene, the durability is vulnerable because the gel content by the crosslinking was insufficient due to the shortage of the reactive hydroxy groups and carboxyl groups in the structure.

In the case of Comparative Example 3, the rubber itself was cured by using a photocurable monomer without participating in the curing, and it could be seen that the peel strength failed to satisfy the required levels as compared to the Examples which contains a rubber that can be cured itself and in which an isobutylene-isoprene rubber (IIR—COOH) having a carboxyl group and an isobutylene-isoprene rubber (IIR—OH) having a hydroxy group were mixed at an appropriate ratio.

In the case of Comparative Example 4, an acrylic resin, in which a base resin was a photocurable type, was used, and when Comparative Example 4 is compared with Examples 1 to 10, it could be seen that an effect was implemented at a predetermined level or more in terms of durability and peel strength, but the effect was not significantly good in terms of water vapor transmission rate.

From the foregoing, it can be seen that the adhesive composition according to an exemplary embodiment of the present invention implements excellent peel strength and water vapor transmission resistance while implementing equal or improved optical characteristics as compared to the existing adhesive. Furthermore, it can be seen that physical properties required according to the use may be improved by mixing the isobutylene-isoprene rubber (IIR—COOH) having the carboxyl group and the isobutylene-isoprene rubber (IIR—OH) having the hydroxy group at an appropriate ratio.

EXPLANATION OF REFERENCE NUMERALS AND SYMBOLS

100: Adhesive film
110: Release film layer
120: Adhesive layer

The invention claimed is:

1. An adhesive composition for optical use, comprising:
a thermally curable rubber comprising an isobutylene-isoprene rubber having a carboxyl group and an isobutylene-isoprene rubber having a hydroxy group; and
a thermal crosslinking agent.

2. The adhesive composition of claim 1, wherein a content of an isoprene unit of the isobutylene-isoprene rubber is 1 mol % or more and 30 mol % or less based on a total mole number of an isobutylene unit and an isoprene unit.

3. The adhesive composition of claim 1, wherein the carboxyl group and the hydroxy group are each grafted to the isoprene unit of the isobutylene-isoprene rubber.

4. The adhesive composition of claim 1, wherein the isobutylene-isoprene rubber having the carboxyl group and the isobutylene-isoprene rubber having the hydroxy group each have a degree of unsaturation of 0 to 1.0.

5. The adhesive composition of claim 1, wherein the isobutylene-isoprene rubber having the carboxyl group and the isobutylene-isoprene rubber having the hydroxy group each have a weight average molecular weight (Mw) of 10,000 to 1,000,000.

6. The adhesive composition of claim 1, wherein a content of the carboxyl group of the isobutylene-isoprene rubber having the carboxyl group is 1 mol % or more and 30 mol % or less based on the total mole number of the isobutylene unit and the isoprene unit.

7. The adhesive composition of claim 1, wherein a content of the hydroxy group of the isobutylene-isoprene rubber having the hydroxy group is 1 mol % or more and 30 mol % or less based on the total mole number of the isobutylene unit and the isoprene unit.

8. The adhesive composition of claim 1, wherein the adhesive composition for optical use comprises the thermal crosslinking agent in an amount of 0.05 to 5 parts by weight based on 100 parts by weight of the thermally curable rubber.

9. The adhesive composition of claim 1, wherein the thermal crosslinking agent comprises one selected from a group consisting of an aziridine-based crosslinking agent, an amine-based crosslinking agent, an isocyanate-based crosslinking agent, an epoxy-based crosslinking agent, and a combination thereof.

10. The adhesive composition of claim 1, wherein a weight ratio of the isobutylene-isoprene rubber having the carboxyl group: the isobutylene-isoprene rubber having the hydroxy group is 1:9 to 9:1.

11. The adhesive composition of claim 1, further comprising:
one selected from a group consisting of a reaction accelerator, a curing retarder, a tackifier, and a combination thereof.

12. The adhesive composition of claim 11, wherein the tackifier comprises one selected from a group consisting of a hydrogenated dicyclopentadiene-based compound, a hydrogenated terpene-based compound, a hydrogenated rosin-based compound, a hydrogenated aromatic compound, and a combination thereof.

13. An adhesive film for optical use, comprising:
an adhesive layer comprising thermally cured products of the adhesive composition for optical use according to claim 1.

14. The adhesive film of claim 13, wherein a gel content of the adhesive layer is 40 wt % to 100 wt %.

* * * * *